Aug. 22, 1961 M. TAMA 2,997,512
CORELESS ELECTRIC INDUCTION FURNACE
Filed Nov. 3, 1958 3 Sheets-Sheet 1
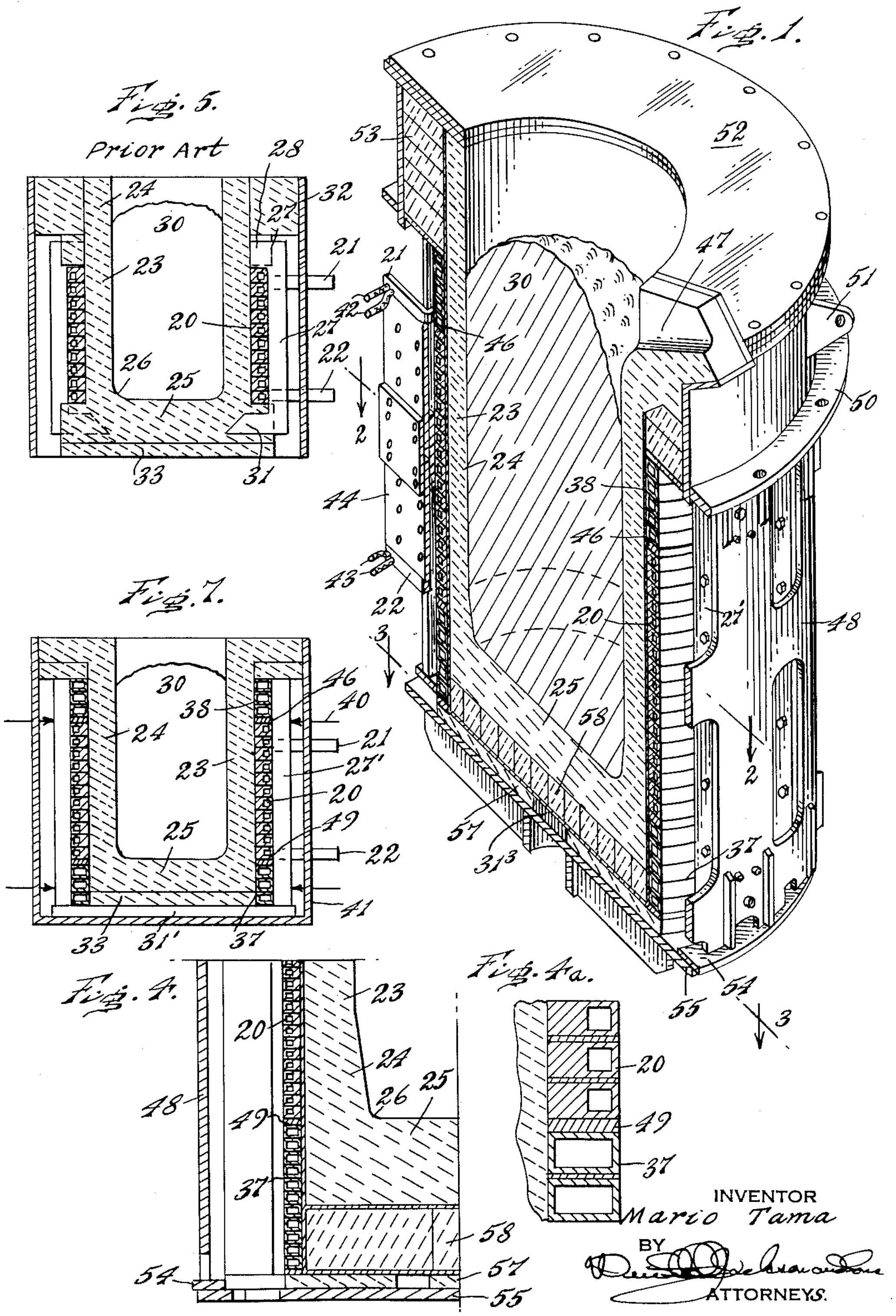
INVENTOR
Mario Tama
BY
ATTORNEYS.

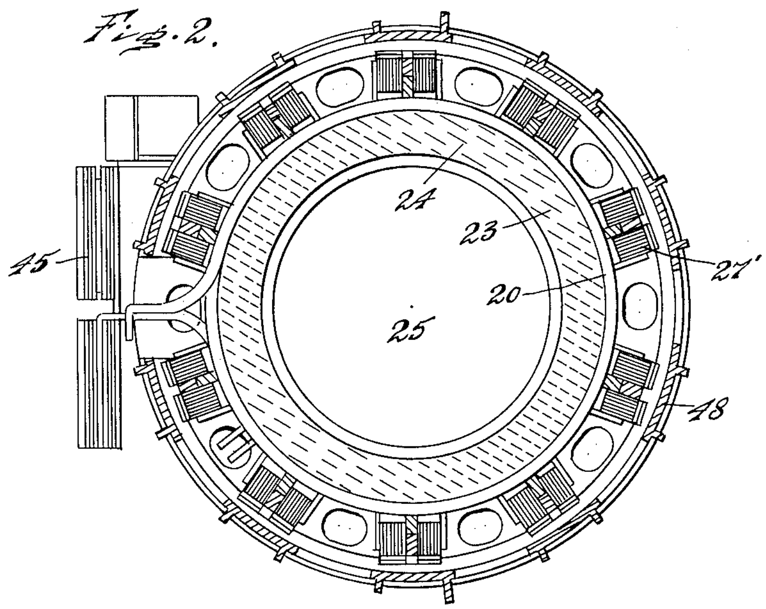
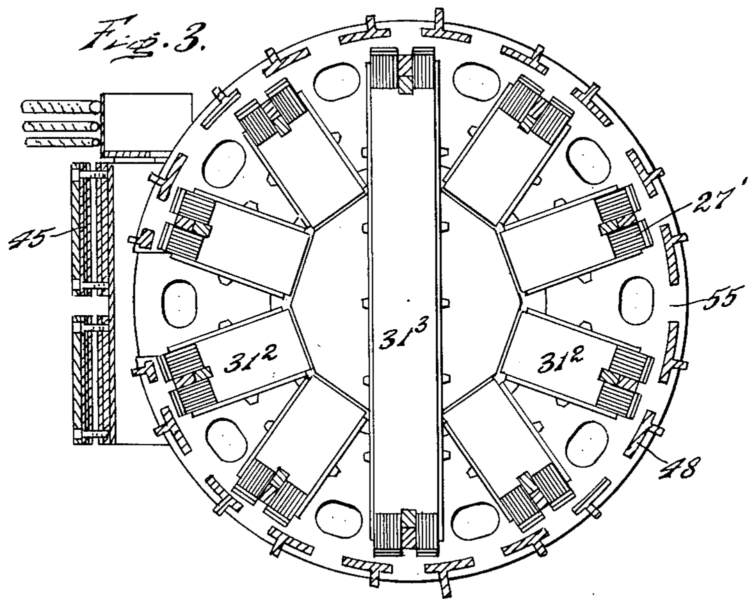
INVENTOR
Mario Tama
BY
ATTORNEYS

CORELESS ELECTRIC INDUCTION FURNACE
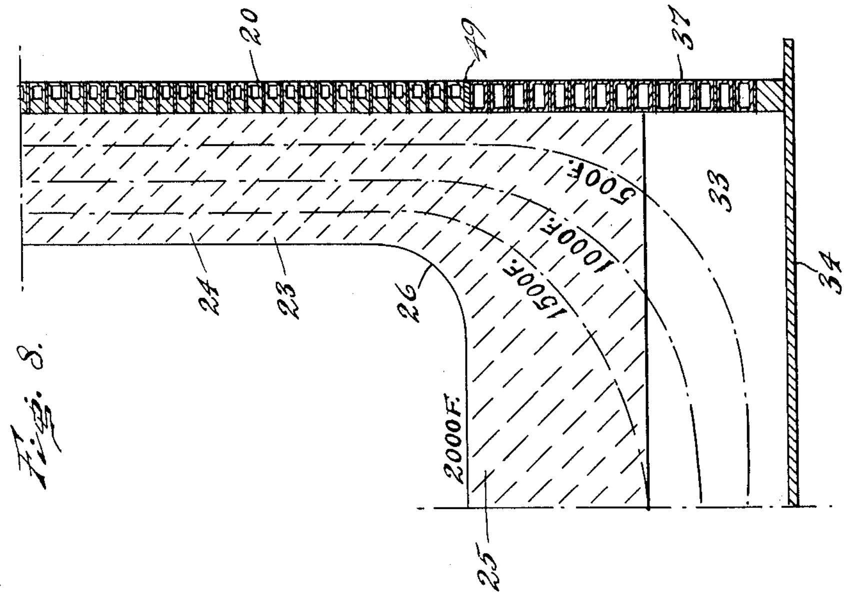
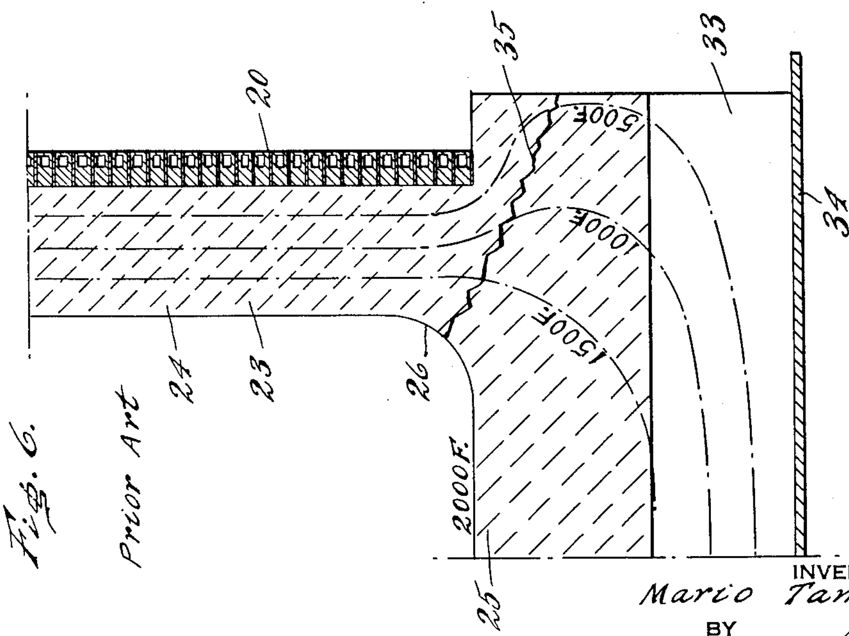
INVENTOR
Mario Tama
BY
ATTORNEYS United States Patent Office 2,997,512

Patented Aug. 22, 1961

2,997,512

CORELESS ELECTRIC INDUCTION FURNACE

Mario Tama, Morrisville, Pa., assignor to Ajax Magnethermic Corporation, Trenton, N.J., a corporation of Ohio Filed Nov. 3, 1958, Ser. No. 771,301
12 Claims. (Cl. 13—27)

The present invention relates to improvements in coreless electric induction furnaces of the type which are used particularly to melt metals such as iron, ferrous alloys, copper, copper base alloys, zinc, zinc base alloys, aluminum, aluminum base alloys, nickel, nickel base alloys, and numerous other metals and alloys.

A purpose of the invention is to reduce the likelihood of refractory failure in a cylindrical coreless electric induction furnace lining in the low frequency field adjacent to the point where the side wall and the bottom wall of the furnace are joined at the bottom corner.

A further purpose is to minimize the tendency of the refractory lining to crack at the lower corner where the relatively thin side wall joins the relatively thicker bottom wall and where the direction of the lining changes in a right angle.

A further purpose is to reduce the abruptness of the change of the temperature gradient at the bottom of the cylindrical side wall of a low frequency coreless electric induction furnace where the side wall joins the bottom wall.

A further purpose is to protect against intrusion of molten metal into cracks in the refractory lining at or below the bottom of the inductor coil in a cylindrical coreless electric induction furnace, thereby assuring that any metal present in the refractory will be solidified.

A further purpose is to provide localized liquid cooling independent of the inductor coil around the bottom of a cylindrical coreless electric induction furnace lining, so as to counteract the influence of the intense magnetic field present at the lower end of the inductor coil.

A further purpose is to employ, around the bottom of a cylindrical refractory lining immediately beneath the lower end of the inductor coil, a liquid cooled coil free from alternating current supply which has a substantially higher electrical resistivity or a substantially lower electrical conductivity than that of copper, thus impeding the flow of secondary currents in the cooling coil.

A further purpose is to additionally provide a localized cooling coil immediately above the upper end of the inductor coil around the side wall of the cylindrical refractory lining.

A further purpose is to position magnetic yokes around the inductor coil and the cooling coils, and desirably extend the magnetic yokes radially inward beneath the lower cooling coil.

Further purposes appear in the specification and in the claims.

FIGURE 1 is a central axial sectional perspective of a coreless electric induction furnace embodying the principles of the invention.

FIGURE 2 is a horizontal section of FIGURE 1 on the line 2—2.

FIGURE 3 is a horizontal section of FIGURE 1 on the line 3—3, omitting the heat insulation.

FIGURE 4 is a fragmentary axial section of the lower portion of the furnace of FIGURE 1, illustrating the construction of the present invention.

FIGURE 4*a* is a fragmentary enlargement of the furnace as shown in FIGURE 4.

FIGURE 5 is a diagrammatic central vertical section of a prior art coreless electric induction furnace in the low frequency field, through the iron yoke at one side and between yokes at the other side.

FIGURE 6 is an enlarged fragmentary axial section of the lower corner of a furnace of the character shown in FIGURE 5, illustrating the character of temperature gradients which are encountered in the refractory, by showing the approximate isothermal surfaces, based on an assumed molten metal temperature of 2000° F.

FIGURE 7 is a diagrammatic central axial section of a furnace embodying the principles of the present invention, illustrating the placement of the top and bottom cooling coils of the same diameter and coaxial with the inductor coil.

FIGURE 8 is an enlarged fragmentary axial section of the lower corner of a furnace of the character shown in FIGURE 7, showing the temperature gradients obtained by means of isothermal lines.

Describing in illustration but not in limitation and referring to the drawings:

Extensive use is being made at the present time of coreless electric induction furnaces operating in the low frequency range for melting metals and alloys. When reference is made herein to a coreless electric induction furnace, it is intended to indicate a furnace in which there is no iron core inside or interthreading the inductor coil, although in many instances there will be iron yokes in the area surrounding the inductor coil and beneath the inductor coil. Unlike the submerged channel core type electric induction furnace, the coreless furnace operates upon a single mass of metal in a pot-like container without channels.

Where reference is made herein to low frequency, it is intended to indicate the range of frequency of alternating current which corresponds to commercial electric utility power sources, which usually operate at 60, 50 or 25 cycles per second, and to the low harmonics thereof which may be produced efficiently by static converters such as saturable magnetic devices. The low frequency field can therefore be defined in a broad way as covering the range from 25 to 400 cycles per second.

In the construction of large low frequency coreless electric induction furnaces having capacities of say from 1 to 20 tons of charge or larger, considerable difficulty has been encountered through cracking of the refractory and discharging the molten metal contents on to the floor or into the furnace pit so as to create a source of grave danger to workmen, cause a fire hazard, damage adjoining equipment and suddenly interrupt furnace operation.

In the larger furnaces, it is usually not practical to preform a refractory container such as a crucible which can be inserted into the coil. Instead it is usually necessary to make the refractory lining by ramming a powdered refractory material into the proper shape inside the inductor coil. Techniques used include hand ramming and the use of vibrating or oscillating air hammers to compact the refractory tightly. Certain of the refractory materials, as well known, develop a strong bond immediately after ramming, and develop high temperature strength while the first charges are heated and melted within the refractory lining. Other refractory materials, as well known in the art, only develop adequate strength after they are brought to high temperature and must be supported on all sides when first heated up to high temperature so that a ceramic bond may be produced.

In common practice, the rammed refractory lining materials occupy substantially the entire space between the molten metal and the electric inductor coil, except for such sheet materials as asbestos or mica which may be used to protect the coil itself or to provide electric insulation around the coil or between its turns. The rammed refractory material also forms the bottom of the container for the molten metal.

In order to prevent excessive loss of heat in the bottom, it is generally not force cooled, and a substantial layer of heat insulating refractory is generally placed underneath the rammed refractory bottom.

One of the limitations on the coreless electric induction furnace is that there must be good coupling between the inductor coil and the charge. Therefore the side walls of the refractory lining between the electric inductor coil and the molten metal must be thin, and in most practical coreless electric induction furnaces the thickness of the side walls ranges between 3 and 5 inches.

It is furthermore required in most coreless electric induction furnace designs that the bottom of the inductor coil should not extend substantially below the bottom of the molten metal charge, since otherwise there is a substantial loss in efficiency and an impairment in electrical characteristics.

A typical prior art low frequency electric induction furnace is illustrated in FIGURE 5, comprising a water cooled electric inductor coil 20 suitably of helical form, hollow and having water passages extending throughout, alternating current at low frequency being connected to the coil 20 at power leads 21 and 22 and water or other liquid coolant being introduced at one of these leads and withdrawn at the other. The inductor coil 20 surrounds a refractory lining 23 which is essentially cylindrical, having cylindrical side walls 24 and a bottom wall 25 connected to the side walls by a rather abrupt corner 26 forming substantially a right angle. In a common prior art form, laminated iron yokes 27 extend vertically at spaced intervals around the coil and at the top they have laminated iron pole pieces 28 extending in close to the molten charge 30 and at the bottom they have laminated iron pole pieces 31 extending in close to the molten charge. In the typical case as shown, the side walls 24 are relatively thin, while the bottom wall 25 of the refractory is relatively thick.

The refractory lining, the inductor coil and the yokes are supported by suitable supporting structure 32, connected to the internal parts by connecting means not shown.

FIGURE 6 is a diagrammatic enlargement of the condition at the lower corner, omitting the magnetic yokes, and illustrating suitable heat insulation 33 and bottom supporting structure 34 to indicate a typical case.

Several conditions prevail at the lower corner 26 which make the refractory very vulnerable to the formation of cracks 35 which occur unpredictably and may lead to sudden leakage of molten metal with very destructive consequences. Where the relatively thin side wall which is force-cooled on the outside joins the relatively thick bottom section which is not force-cooled on the outside, there occurs a very abrupt change in the temperature gradient through the lining, as illustrated by the sudden spreading of the isothermal surfaces. Thermal expansion in the bottom section will be greater, and follow a different pattern in the bottom section as compared to the side wall. Furthermore, the inductor coil 20 to some extent restrains the expansion of the annular side wall section, whereas expansion of the bottom section under the coil is in no way restrained mechanically. Cracks, therefore, are likely to form in the place indicated by line 35 in FIGURE 6.

Furthermore, in the very area most vulnerable to the formation of such cracks, there exists the very strong electromagnetic end field of the inductor coil. Molten metal will first seep into the crack 35 at least up to, and somewhat beyond the isothermal surface corresponding to its melting point. Note that in the area immediately below the inductor coil, where the crack 35 tends to form, these isothermal surfaces spread outward substantially, causing the metal to leak into the crack for a considerable distance. If the crack is large enough, the electromagnetic end field of the coil then may induce sufficient heat in the metal contained in the fissure to cause it to melt again and run further towards the outside. Successive heating and cooling cycles tend to enlarge the crack. More inductive heating of the metal in the crack 35 occurs as the mass of metal contained in it increases. Finally, suddenly and unpredictably molten metal will reach the outside, causing the entire molten contents of the furnace to discharge into the electric furnace basement area, where it will cause much damage.

I have discovered that the formation of cracks at the lower corner of the refractory lining can be very greatly reduced or avoided, and the hazard of molten metal leakage greatly reduced by modifying the furnace construction to follow the principles set forth in FIGURE 7, and illustrated more in detail in FIGURE 8. In accordance with the prior practice, I terminate the inductor coil 20 at the level of the bottom of the charge, and coaxial with the inductor coil 20 and immediately beneath it with the same diameter at the adjoining ends, I provide a hollow liquid cooled cylindrical coil 37 which is not supplied with electric current. The coil 37 extends around and in contact with the refractory bottom 25, and also suitably around the heat insulation 33. The intense magnetic field at the bottom of the inductor coil still exists but the cooling effect of the bottom auxiliary cooling coil 37 greatly increases the steepness of the temperature gradient in the outer part of the bottom section as shown by the change in shape of the isothermal lines in FIGURE 8 as compared with FIGURE 6.

In the preferred embodiment I also place coaxial with the inductor coil a top auxiliary liquid cooled cylindrical coil 38 which has the same diameter as the inductor coil at the adjoining ends and which also is not supplied with electric current.

The lower auxiliary cooling coil is immediately adjoining the lower end of the inductor coil and the upper auxiliary cooling coil is immediately adjoining the upper end of the inductor coil, so that liquid cooling is substantially continuous around the side wall 24 of the refractory and also around the bottom 25.

The auxiliary cooling coil at the bottom by steepening the temperature gradient in the bottom section to be more nearly the same as in the side wall, causes a much less abrupt and more gradual change in temperature gradients at the point where the side wall meets the bottom section. The expansion of the bottom section is more nearly the same as that of the side wall. This minimizes the tendency to form cracks in this case. Furthermore, the auxiliary cooling functions to prevent damage in case a crack does occur. If a crack occurs and molten metal tends to penetrate it, the steep temperature gradient, due to the cooling effect of the auxiliary cooling coil 37, will cause the molten metal to solidify, after running for a short distance, and not reach the above mentioned strong electromagnetic end field of the induction coil which would cause it to melt again as described earlier.

It will thus be evident that the use of a cooling coil in accordance with my invention, reduces the likelihood of cracking at the critical lower right angle corner, and the cooling effect by freezing any metal that tends to leak will reduce the likelihood that a crack can cause damage.

Thus it will be evident that in operation, the auxiliary cooling coil at the bottom beneath the inductor provides a safety factor against escape of molten metal through cracks which is at least as great as that provided by the inductor coil itself in the area immediately inside the inductor coil. That this safety factor is adequate is indicated by the fact that in previous experience failures by leakage of molten metal to the inductor coil have been relatively rare, while failures at the bottom corner beneath the inductor coil have been rather common.

The presence of an auxiliary cooling coil immediately above the inductor coil is also advantageous for reasons similar to those expressed above, except that the abrupt right angle bend at the corner does not exist at the top and therefore the likelihood of cracking at the top is less pronounced.

In accordance with the invention, I preferably surround the inductor coil and the auxiliary cooling coils with vertically extending yokes of magnetic material 27', which preferably connect at the bottom with inwardly extending yoke elements 31'. The inductor coil and the bottom and top auxiliary cooling coils are conveniently supported by inward pressure of the yoke elements suggested by arrows 40 and applied from a surrounding frame structure 41. This feature of support of the furnace by inward pressure on the yokes is embodied in my copending application for Coreless Induction Furnace Melting of Metals, Serial No. 760,972, filed September 15, 1958. This improved support of the refractory further contributes to preventing cracking in the refractory.

The yokes are in turn supported by a rigid surrounding metallic structure, and this supporting structure, through the yokes, the inductor coil and the cooling coils, firmly supports the side of the refractory lining and restrains the lining.

In the preferred embodiment of the present invention, the auxiliary cooling coils at the bottom and preferably also at the top are made of a metal which has a high resistivity or low electrical conductivity compared with copper. I preferably use metals which have an electrical conductivity not exceeding ⅕ that of copper and most desirably use metals which have an electrical conductivity not exceeding $\frac{1}{10}$ that of copper.

Suitable materials are the copper-silicon alloys such as ASTM B97–55, alloy A, B or C; or ASTM B98–55, alloy A, B or D; or the aluminum bronzes such as ASTM B169–58, alloy A, C or D; or ASTM B150–58, alloy No. 1, No. 2, or No. 3; or the nickel-silvers such as ASTM B122–55T, alloys 1 to 9; or B151–58, alloys A to E. A suitable commercial example is the copper alloy containing 1½ percent silicon known as Everdur. Nonmagnetic stainless steel is suitable for the bottom and top auxiliary coils, a typical example being the grade containing 18 percent of chromium and 8 percent of nickel or the grade containing 16 percent of chromium, the balance being iron.

The compositions of the above stated alloys are as follows:

ASTM B97–55

| | Alloy A | Alloy B | Alloy C |
|---|---|---|---|
| Copper, min, percent | 94.8 | 96.0 | 91.0 |
| Silicon, percent | 2.8 to 3.8 | 0.8 to 2.0 | 2.0 to 3.0 |
| One or more of the following elements may be present within the limits specified below: | | | |
| Manganese, max, percent | 1.5 | 0.7 | |
| Zinc, max, percent | 1.5 | | |
| Iron, max, percent | 1.6 | 0.8 | 0.8 |
| Nickel, max, percent | 0.6 | | 0.6 |
| Lead | 0.05 | 0.05 | 0.05 |

ASTM B98–58

| | Alloy A | Alloy B | Alloy D |
|---|---|---|---|
| Copper, min, percent | 94.8 | 96.0 | 94.0 |
| Silicon, percent | 2.8 to 3.8 | 0.8 to 2.0 | 2.8 to 3.5 |
| Lead, percent | | | 0.2 to 0.8 |
| One or more of the following elements may be present within the limits specified below: | | | |
| Manganese, max, percent | 1.5 | 0.7 | 1.5 |
| Zinc, max, percent | | 1.5 | |
| Iron, max, percent | 1.6 | 0.8 | 0.25 |
| Lead, max, percent | 0.05 | 0.05 | |

ASTM B150–58

| | Alloy No. 1 | Alloy No. 2 | Alloy No. 3 |
|---|---|---|---|
| Copper, percent | 80.0 to 93.0 | 78.0 to 85.0 | 88.0 to 92.5 |
| Aluminum, percent | 6.5 to 11.0 | 9.0 to 11.0 | 6.0 to 8.0 |
| Iron, percent | 4.0 max | 2.0 to 4.0 | 1.5 to 3.5 |
| Nickel, percent | 1.0 max | 4.0 to 5.5 | |
| Silicon, max, percent | 2.2 | 0.25 | |
| Manganese, max, percent | 1.5 | 1.5 | |
| Tin, max, percent | 0.6 | 0.20 | |
| Zinc, max, percent | 1.0 | | |
| Tellurium, max, percent | 0.6 | | |

ASTM B122–55T

| | Copper, percent | Nickel, percent | Zinc, percent |
|---|---|---|---|
| No. 1 | 72 | 18 | 10 |
| No. 2 | 65 | 18 | 17 |
| No. 3 | 66 | 10 | 24 |
| No. 4 | 55 | 18 | 27 |
| No. 5 | 70 | 30 | |
| No. 6 | 80 | 20 | |
| No. 7 | 75 | 20 | 5 |
| No. 8 | 56.5 | 12.0 | 31.5 |
| No. 9 | 70 | 10 | 20 |

COMPOSITIONS

| Alloy | Nominal Composition | | | |
|---|---|---|---|---|
| | Copper, Percent | Nickel, Percent | Zinc, Percent | Lead, Percent |
| A | 65 | 18 | 17 | |
| B | 55 | 18 | 27 | |
| B-1 | 60 | 18 | 22 | |
| C | 62 | 18 | 19 | 1 |
| D | 65 | 12 | 23 | |
| E | 65 | 10 | 25 | |

In FIGURES 1 to 4 inclusive, I illustrate a convenient embodiment of the coreless electric induction furnace of the invention. In this case the inductor coil 20 which is hollow and water cooled, has suitable electrical leads 21 and 22 at the ends, provided with water connections 42 at the top and 43 at the bottom and mounted on an insulating mounting 44. The leads are connected to suitable transformer and other auxiliary electric equipment (not shown) through flexible leads 45.

The coil 20 is a right circular cylinder in the preferred embodiment though it may of course have an elliptical or other suitable contour, and its axis is placed generally vertically when the furnace is upright.

Immediately beneath the inductor coil and in prolongation with it is placed the hollow auxiliary cooling coil 37, which is preferably a right circular cylinder of the same cross section and the same diameter, and is provided with water connection not shown. The bottom cooling coil is preferably immediately against the bottom of the inductor coil, merely being separated by a thin layer of electrical insulation 49.

Immediately above and coaxial with the inductor coil is the top auxiliary cooling coil 38 which is preferably a right circular cylinder of the same diameter and placed right agains the top of the inductor coil, merely being separated by a layer of electrical insulation 46. The top auxiliary cooling coil is provided with water connections not shown. The individual turns of the inductor coil and the cooling coils will where desired be insulated by a suitably thin material such as asbestos or mica.

The refractory lining is disposed with respect to the inductor coil and the cooling coil is already described and extends upward at the top to a pouring spout 47.

As best seen in FIGURES 2 and 3, a series of laminated yokes 27' of iron (high silicon steel sheet) extend vertically immediately outside the inductor coil 20 and the bottom and top auxiliary cooling coils, pressed against them but conveniently insulated as by sheet material such as asbestos or mica. The yokes are spaced around the coils. The yokes are pushed inwardly to firmly support the coils and thus support the refractory.

The yokes are backed by and supported by a metallic barrel or cage 48 (suitably of magnetic steel) surrounding the entire furnace provided with suitable cut-outs, and connected to a supporting flange 50 and provided with lifting lugs 51. The barrel or cage at the top mounts a furnace top 52 and the space inside the barrel or cage at the top not occupied by the lining is filled with heat insulation 53.

At the bottom the barrel or cage 48 has a flange 54 which removably connects to a furnace bottom plate 55 suitably of magnetic steel which has suitable cut-outs and strengthening ribs. From each of the yokes 27′ beneath the auxiliary cooling coil 36 and above the bottom plate 55 a radially inwardly extending body of laminated iron is provided at $31^2$. Most of the inward extending yoke portions at the bottom terminate short of the center, but one of them extends clear across at $31^3$, as shown in FIGURE 3.

Above the bottom plate 55 in the spaces not occupied by the inwardly extending yoke portions is placed heat insulation 57 and above this there is a series of heat insulating blocks 58 which support the bottom of the furnace.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. A coreless electric induction furnace for melting metal, comprising a first cylindrical liquid cooled coil having its axis disposed generally vertically, means for supplying alternating electric current at a frequency between 25 and 400 cycles per second to said first coil, a second cylindrical liquid cooled coil free from electric current supply, disposed coaxial with and below said first coil in close proximity thereto, the inside diameters of said first coil and said second coil being essentially the same at the adjacent ends, a cylindrical refractory lining adapted to contain molten metal having side walls disposed within said first coil and a bottom wall disposed within said second coil, and structural means supporting said first and second coils and supporting the bottom wall of said refractory lining.

2. A furnace of claim 1, in which the side walls of the refractory lining extend substantially above the top of said first coil, in combination with a third cylindrical liquid cooled coil free from electric current supply, disposed coaxial with and above said first coil in close proximity thereto, the inside diameters of said first coil and said third coil at the adjacent ends being essentially the same.

3. A furnace of claim 2, wherein said structural means includes laminated yokes of magnetic iron minimizing eddy current losses and providing magnetic flux return means.

4. A furnace of claim 3, in which said second coil and said third coil have electrical conductivities substantially lower than that of copper.

5. A furnace of claim 2, wherein said second coil and said third coil have electrical conductivities substantially lower than that of copper.

6. A furnace of claim 1, wherein said structural means includes laminated yokes of magnetic iron minimizing eddy current losses and providing magnetic flux return means.

7. A furnace of claim 6, in which said second coil has an electrical conductivity substantially lower than that of copper.

8. A furnace of claim 6, in combination with extensions on the laminated iron yokes beneath said second coil extending radially inwardly and assisting in magnetic flux return in the space beneath the bottom of the refractory.

9. A furnace of claim 1, wherein said second coil has an electrical conductivity substantially lower than that of copper.

10. A furnace of claim 1, in which the refractory side wall is relatively thin and the refractory bottom wall is relatively thick.

11. In an electric induction furnace of the type which operates on alternating current of low frequency, a refractory container having cylindrical generally vertically disposed side walls and a generally horizontal bottom wall connecting to said side walls at a bottom corner, the refractory container being adapted to hold a charge of molten metal which occupies the space above the bottom wall and within the side walls, an electric inductor coil surrounding the refractory side walls and terminating at the bottom adjacent the corner between the bottom wall and the side walls, and liquid cooling means independent of the inductor coil surrounding the refractory bottom of the refractory lining, and localized in the space at and below the bottom of the electric inductor coil, said liquid cooling means increasing the steepness of temperature gradients at said corner and tending to solidify any molten metal which may be present in the refractory adjacent said corner.

12. A coreless electric induction furnace for melting metal, comprising a first cylindrical liquid cooled coil having its axis disposed generally vertically, means for supplying low frequency alternating electric current to said first coil, a second cylindrical liquid cooled coil free from electric current supply, disposed coaxial with and below said first coil in close proximity thereto, the inside diameters of said first coil and said second coil being essentially the same at the adjacent ends, a cylindrical refractory lining adapted to contain molten metal having side walls disposed within said first coil and a bottom wall disposed within said second coil, and structural means supporting said first and second coils and supporting the bottom wall of said refractory lining.

References Cited in the file of this patent

UNITED STATES PATENTS

| | | |
|---|---|---|
| 1,842,272 | Kneer | Jan. 19, 1932 |
| 1,859,419 | Willcox | May 24, 1932 |
| 1,879,360 | Linnhoff | Sept. 27, 1932 |
| 2,732,292 | Jordan | Jan. 24, 1956 |
| 2,852,587 | Junker | Sept. 16, 1958 |

OTHER REFERENCES

Germany, D13702 VIII d/21h, Nov. 8, 1956.